United States Patent
Fleenor et al.

(10) Patent No.: US 6,877,909 B2
(45) Date of Patent: Apr. 12, 2005

(54) ANGLED PHYSICAL CONTACT FERRULE AND ASSOCIATED METHOD AND APPARATUS FOR FABRICATING SAME

(75) Inventors: Paul A. Fleenor, Hickory, NC (US); Joel C. Rosson, Hickory, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 0 days.

(21) Appl. No.: 10/811,194

(22) Filed: Mar. 26, 2004

(65) Prior Publication Data

US 2004/0179788 A1 Sep. 16, 2004

Related U.S. Application Data

(63) Continuation of application No. 09/615,397, filed on Jul. 13, 2000, now Pat. No. 6,712,526.

(51) Int. Cl.[7] ................................................. G02B 6/36
(52) U.S. Cl. ....................................................... 385/78
(58) Field of Search ............................. 385/58, 60, 70, 385/72, 77, 78

(56) References Cited

U.S. PATENT DOCUMENTS

| | | | | |
|---|---|---|---|---|
| 5,245,684 A | * | 9/1993 | Terao et al. | 385/78 |
| 5,351,327 A | * | 9/1994 | Lurie et al. | 385/78 |
| 6,126,519 A | * | 10/2000 | Minami et al. | 451/41 |

* cited by examiner

Primary Examiner—Thanh-Tam Le

(57) ABSTRACT

A ferrule is provided that can be fabricated in a repeatable and an efficient manner so as to have a relatively small apex offset. The ferrule includes a front face having a plateau defining a plane that extends perpendicular to the longitudinal axis and a hemispherical portion through which a longitudinal bore opens. The hemispherical portion is generally angled relative to the plateau and to the plane perpendicular to the longitudinal axis defined by the plateau. In this regard, a plane coincident with the centerline of the ferrule is disposed at an offset angle, typically between 8° and 12°, relative to the plane perpendicular to the longitudinal axis such that the resulting ferrule is an angled physical contact (APC) ferrule. A method and apparatus for fabricating the ferrule are also provided that grind a portion of the front face of the ferrule into a hemispherical shape with a relatively small apex offset regardless of the amount of material that is removed from the front face of the ferrule.

17 Claims, 4 Drawing Sheets

ANGLED PHYSICAL CONTACT FERRULE AND ASSOCIATED METHOD AND APPARATUS FOR FABRICATING SAME

RELATED APPLICATIONS

The present application is a Continuation of U.S. Ser. No. 09/615,397 filed on Jul. 13, 2000 now U.S. Pat. No. 6,712,526, which is incorporated herein by reference.

FIELD OF THE INVENTION

The present invention relates generally to ferrules for mounting upon the end portions of optical fibers and, more particularly, to angled physical contact (APC) ferrules and associated methods and apparatus for fabricating APC ferrules.

BACKGROUND OF THE INVENTION

A variety of ferrules have been developed to facilitate the interconnection of optical fibers, with other optical fibers, optical devices or the like. For example, a number of standard ferrules, such as SC, FC, and ST ferrules, have been designed. Regardless of their type, ferrules typically define one or more longitudinal extending bores for receiving end portions of respective optical fibers.

One common type of ferrule is an APC ferrule that is designed to make physical conduct with another APC ferrule during the process of interconnecting a pair of optical fibers. Notably, the front face of an APC ferrule is disposed at a nonorthogonal angle, i.e., at other than 90°, relative to the longitudinal axis defined by the ferrule. For example, the front face of an APC ferrule is commonly disposed at an angle of approximately 8° relative to a plane that extends perpendicular to the longitudinal axis defined by the ferrule. In order to interconnect a pair of APC ferrules, the ferrules are therefore positioned such that the angled front faces are complimentary to one another, that is, the forwardmost portion of the front face of one ferrule is preferably aligned with the rearwardmost portion of the front face of the other ferrule and vice versa. In order to facilitate the alignment of the ferrules in this complimentary fashion, the ferrules typically include a key that is disposed in a predetermined relationship to the front face of the ferrule. Thus, a connector sleeve or the like can be utilized to engage the keys of a pair of APC ferrules to insure that the ferrules are mated in a complementary fashion.

The angled front face of an APC ferrule advantageously reduces undesirable reflections of optical signals at the interface between a pair of optical fibers, thereby decreasing optical power losses and correspondingly increasing optical power transmission. In addition to forming the ferrule to have a front face that is disposed at a predetermined angle relative to the longitudinal axis defined by the ferrule, the front face of some APC ferrules has a spherical shape. In this regard, if an APC ferrule is constructed such that the apex of the spherical surface substantially coincides with the bore defined by the ferrule, physical contact between the end portions of the respective optical fibers is facilitated, thereby enhancing optical transmission between the optical fibers. Unfortunately, it is relatively difficult to shape the spherical surface of an APC ferrule such that the apex of the spherical surface coincides with the bore defined by the ferrule. Instead, APC ferrules having a spherical front face generally have an apex offset that is defined as the distance by which the apex of the spherical surface is offset from the bore defined by the ferrule. While some apex offset can be tolerated while still maintaining optical transmission between the respective optical fibers, signal transmission can be adversely impacted if the apex offset becomes too large, such as greater than 50 microns. The degree of apex offset that can be tolerated is dependent upon several factors including whether the optical fibers are single mode or multimode, as well as the radius of curvature of the spherical surface. In this regard, greater apex offsets are typically acceptable for spherical surfaces having larger radii of curvature than for spherical surfaces having smaller radii of curvature.

Conventional APC ferrules that are to include a spherical front face typically require that the amount of material that is removed from the front face of the ferrule to define the spherical surface be precisely controlled so as to form the spherical surface in such a manner that the apex of the spherical surface coincides with the bore defined by the ferrule. In this regard, the removal of either too much or too little material during the process of grinding the front face of an APC ferrule into a spherical shape would typically result in the apex of the spherical surface being offset from the bore defined by the ferrule. In an attempt to minimize the apex effect, at least some of the prior techniques for grinding the front face of an APC ferrule to define the spherical surface are relatively complex, thereby decreasing the efficiency and increasing the cost at which APC ferrules can be fabricated.

One exemplary APC ferrule is described by U.S. Pat. No. 5,351,327 along with several techniques for fabricating the APC ferrule. As described, the APC ferrule has a spherically shaped front face with an apex offset of no more than 50 microns and, more typically, no more than 10 microns. While several different fabrication techniques are described, most of the techniques require that the front face of the ferrule be formed into a temporary surface that is then repolished to form the desired spherical surface. The temporary surface can be either flat or spherical and is typically angled or inclined relative to a plane perpendicular to the longitudinal axis defined by the ferrule. Unfortunately, the repolishing of the front face and the other finishing operations disadvantageously consume polishing consumables and reduce the efficiency with which the ferrules can be fabricated.

In addition, U.S. Pat. No. 5,148,660 describes an APC ferrule having a spherical front surface that is angled relative to a plane perpendicular to the longitudinal axis defined by the ferrule. The APC ferrule described by U.S. Pat. No. 5,140,660 includes a cylindrical tip or pedestal that extends forwardly from the main portion of the ferrule body and that has a smaller diameter than the main portion of the ferrule body. As such, the cylindrical tip may damage surfaces that come into contact with the front face of the ferrule, such as by tearing polishing film or cleaning clothes.

While a number of APC ferrules have therefore been proposed that include spherical front faces, each of these conventional APC ferrules is subject to some shortcomings. For example, the process of grinding the front face of the ferrule may have to be closely monitored since the removal of too much or too little material may disadvantageously increase the apex offset. In addition, some APC ferrules may require extensive polishing or other finishing operations such that the front face is sufficiently smooth, thereby increasing the fabrication costs and the resulting cost of the APC ferrules. Thus, with increasing emphasis being placed upon lowering the cost of ferrules and reducing the permissible tolerances of the ferrules, an improved APC ferrule is desired that offers a reduced apex offset and that can be fabricated in a relatively simple fashion, thereby reducing fabrication costs and the cost of the resulting APC ferrules relative to conventional fabrication techniques.

SUMMARY OF THE INVENTION

A ferrule is therefore provided that can be fabricated in a repeatable and an efficient manner so as to have a relatively small apex offset. In this regard, a method and apparatus for fabricating a ferrule are also provided that grind a portion of the front face of the ferrule into a hemispherical shape with a relatively small apex offset regardless of the amount of material that is removed from the front face of the ferrule. Since the apex offset is not dependent upon the amount of material removed from the front face of the ferrule to define the hemispherical surface, the method and apparatus for fabricating the ferrule can be performed in a repeatable manner with a minimum number of finishing steps being required after the grinding process to complete the fabrication of the ferrule.

According to one advantageous aspect of the present invention, a ferrule is provided that includes a ferrule body extending lengthwise between opposed front and rear faces and defining a longitudinal axis. The ferrule body also defines a lengthwise extending bore capable of receiving an end portion of an optical fiber. According to the present invention, the front face of the ferrule body includes a plateau defining a plane that extends perpendicular to the longitudinal axis and a hemispherical portion through which the bore opens. Typically, the hemispherical portion is rearward of the plateau such that the plateau defines the forwardmost portion of the ferrule body.

The hemispherical portion of the front face of the ferrule body is preferably angled relative to the plateau and to the plane perpendicular to the longitudinal axis defined by the plateau. In this regard, a plane tangent to the hemispherical portion at a point coincident with the longitudinal axis is disposed at an offset angle, typically between 8° and 12°, relative to the plane perpendicular to the longitudinal axis such that the resulting ferrule is an APC ferrule. The plateau is generally smaller than the hemispherical portion with the plateau typically extending across less than 50% of the front face of the ferrule body, and the hemispherical portion extending across more than 50% of the front face of the ferrule body. The plateau is also typically disposed proximate a side surface of the ferrule body and, in instances in which a portion of the ferrule body proximate the front face is chamfered, the plateau is preferably disposed proximate the chamfer.

By constructing the ferrule to have a front face that includes a plateau and a hemispherical portion, the ferrule of the present invention provides an angled front face for minimizing reflections and for facilitating optical coupling with the optical fiber upon which the ferrule is mounted. In addition, the ferrule of the present invention can be readily fabricated such that the apex offset that is both repeatable and relatively small.

According to another aspect of the present invention, a method and apparatus for fabricating a ferrule, such as an APC ferrule, are provided. In this regard, the ferrule is initially secured within a mounting fixture, such as a collet, such that the front face of the ferrule is exposed. At this initial stage of the fabrication process, the front face of the ferrule is typically perpendicular to the longitudinal axis defined by the ferrule. A grinder is also provided that includes a spindle adapted for rotation about a spindle axis that is offset by a predetermined angle, such as between 8° and 12°, from a plane perpendicular to the longitudinal axis. The grinder also includes a grinding wheel mounted upon the spindle for rotation therewith about the spindle axis. To impact the spherical surface, the grinding wheel has an arcuate grinding surface that generally defines a radius of curvature of between 5 mm and 12 mm. The grinder is also adapted to rotate both the spindle and the grinding wheel about an offset axis that is orthogonal to the spindle axis and is coplanar with both the spindle axis and the longitudinal axis defined by the ferrule. Typically, the grinder rotates the spindle and the grinding wheel at a faster rate about the spindle axis than about the offset axis.

At least one of the grinding wheel and the ferrule is then advanced toward the other by means of a translation device such as a translation stage. In particular, the translation device advances at least one of the grinder and the mounting fixture toward the other along a motion axis that extends parallel to the longitudinal axis and that is coplanar with the spindle axis, the offset axis, and the longitudinal axis. During this advancement, the grinding wheel is rotated about both the spindle axis and the offset axis in order to engage and grind a portion of the front face of the ferrule into a hemispherical shape. Typically, the advancement of at least one of the grinder and the mounting fixture is halted prior to grinding all of the front face of the ferrule into a hemispherical shape such that a portion of the front face of the ferrule remains as a plateau that extends substantially perpendicular to the longitudinal axis defined by the ferrule.

While either or both of the grinder and the mounting fixture can be advanced toward the other, a translation stage typically advances the grinder toward the ferrule along the motion axis, while the mounting fixture remains fixed in position. In order to insure that the proper portion of the front face of the ferrule is ground into a hemispherical shape, the position of at least one of the ferrule and the grinder is adjusted relative to the other before commencing grinding. In this regard, the apparatus can include a plurality of adjustment stages for adjusting the position of the mounting fixture in respective planes relative to the grinder.

By fabricating the ferrule according to the method and apparatus of the present invention, a ferrule having an at least partially angled front face and a relatively small apex offset, such as 50 microns or less, can be fabricated in a repeatable and an efficient manner. In this regard, since the front face of the ferrule has both a plateau and a hemispherical portion, the apex offset is not dependent upon the amount of material removed from the front face during the process of grinding the hemispherical surface. As such, ferrules can be repeatedly fabricated that have approximately the same relatively small apex offset. In addition, the method and apparatus for fabricating the ferrule of the present invention also minimizes finishing steps that would otherwise have to be taken in order to complete the fabrication of the ferrule, such as by minimizing the subsequent polishing of the front face of the ferrule since the grinding procedure also produces a relatively hemispherical surface. Thus, the efficiency of the fabrication process is increased and the costs of fabrication are potentially decreased.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
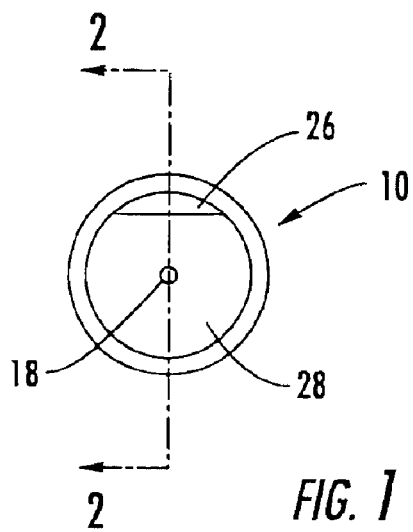
FIG. 1 is a plan view of the front face of the ferrule according to one embodiment of the present invention.
Figure 2:
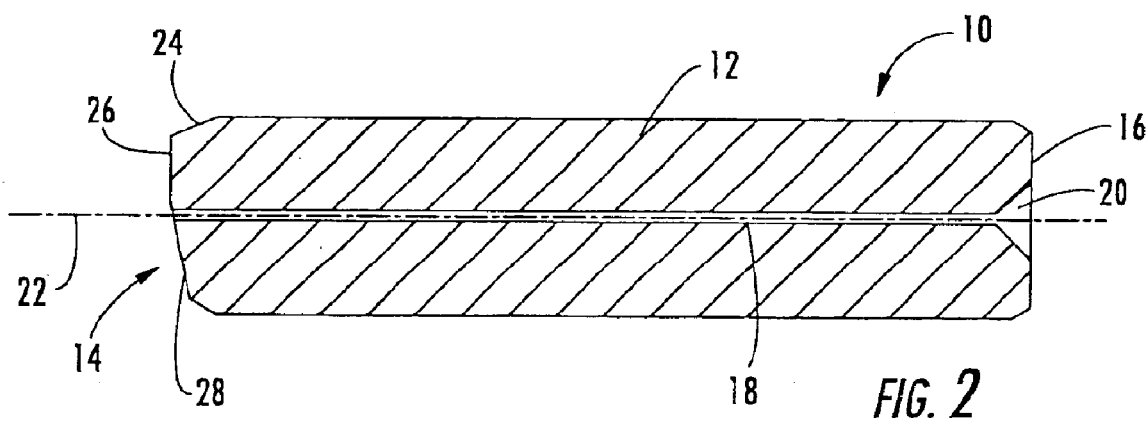
FIG. 2 is a cross-sectional view of the ferrule of FIG. 1 taken along line 2—2.

An APC ferrule 10, such as an ST, SC, or FC ferrule, is provided that can be efficiently and repeatedly fabricated. As shown in FIGS. 1 and 2, the ferrule includes a ferrule body 12 extending lengthwise between the opposed front and rear faces 14, 16. The ferrule is typically formed of a ceramic material, but can be formed of other materials, such as glass, if so desired. The ferrule body is generally cylindrical and defines a lengthwise extending bore 18 for receiving the end portion of an optical fiber such that the ferrule can be mounted thereupon. In this regard, the portion of the bore proximate the rear face of the ferrule body can taper radially outward in order to provide a lead-in section 20 for funneling the optical fiber into the bore. Typically, the APC ferrule is designed to be mounted upon a single optical fiber, such as either a single-mode optical fiber or a multi-mode optical fiber.

The ferrule body 12 also defines a longitudinal axis 22 extending lengthwise between the opposed front and rear faces 14, 16 along the center line of the ferrule body. In addition, the bore is also typically centered about the longitudinal axis. The ferrule can also include a chamfer 24 proximate the front face to facilitate the insertion and alignment of a ferrule within a connector sleeve or the like and to reduce the size of the front face that must be ground and polished. Typically, the chamfer defines a 30° angle with respect to longitudinal axis. However, the chamfer can define other angles with respect to longitudinal axis, if so desired.

Figure 3:
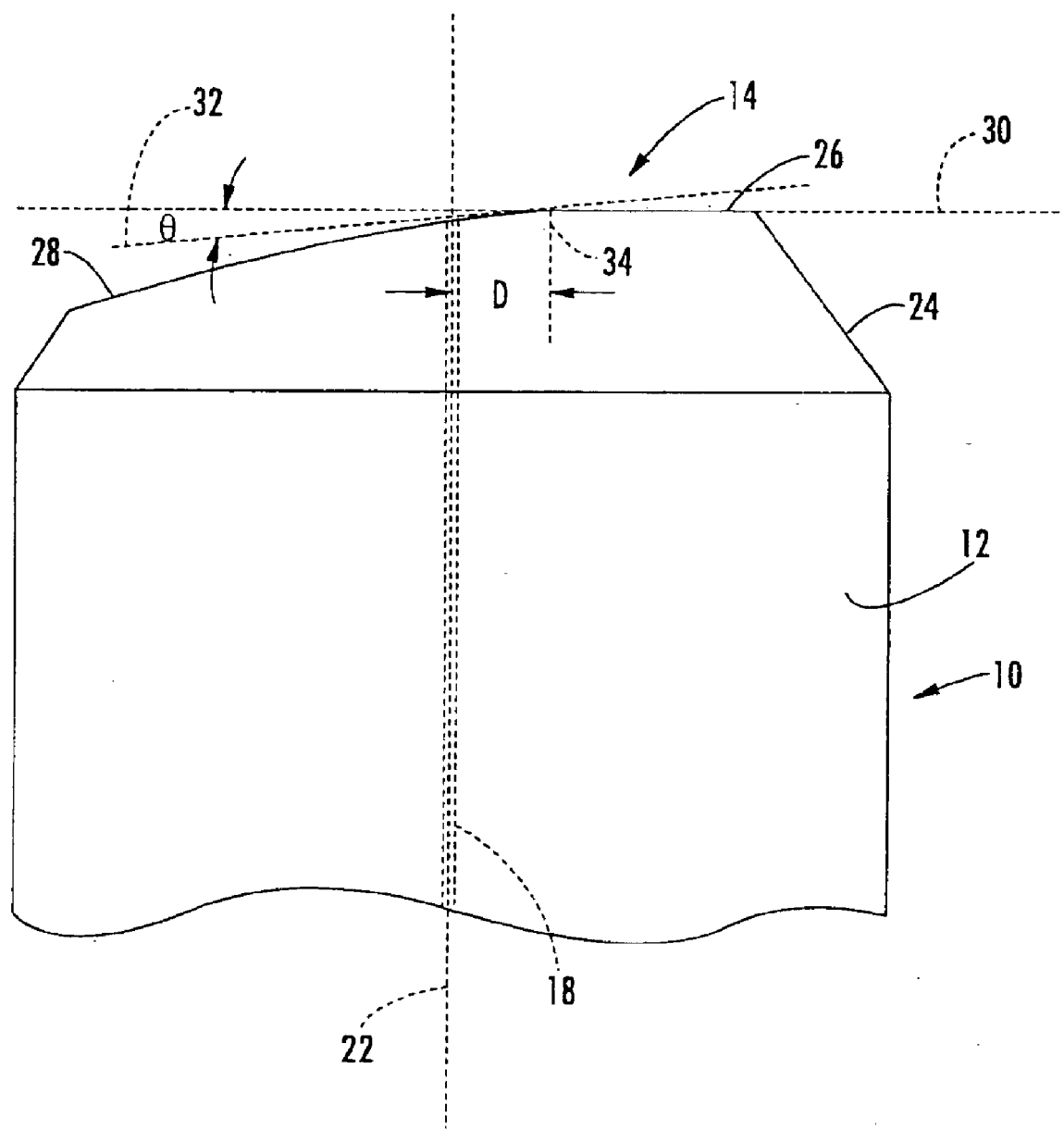
FIG. 3 is a schematic representation of the front face of a ferrule according to one embodiment of the present invention illustrating the plateau and the hemispherical portion in more detail.

According to the present invention, the front face 14 of the ferrule body 12 is formed to include a plateau 26 and a hemispherical portion 28. As depicted in FIGS. 1–3, the plateau defines a plane (designated 30 in FIG. 3) that extends perpendicular to the longitudinal axis 22 of the ferrule body. In contrast, the hemispherical portion defines a spherical shape that is angled somewhat relative to the plane that extends perpendicular to the longitudinal axis, thereby providing an angled front face that facilitates contact between the front face of the ferrule and another APC ferrule. Among other things, this physical contact reduces attenuation, typically to less than 0.3 dB with an average of about 0.1 dB. As shown, the plateau is preferably the forwardmost portion of the ferrule 10 with the hemispherical portion being continuous with the plateau, but generally disposed somewhat rearward of the plateau. In addition, the hemispherical portion is formed such that the bore 18 defined by the ferrule body opens through the hemispherical portion. As such, the hemispherical portion typically extends across more than 50% of the front face of the ferrule body with the plateau extending across the remainder, i.e., less than 50%, of the front face of the ferrule body. In addition, the plateau is typically disposed proximate a side surface of the ferrule body and, more particularly, proximate the chamfered portion 24 of the side surface of the ferrule.

The hemispherical portion 28 of the front face 14 is preferably angled such that a plane 32 at a point coincident with the longitudinal axis 22, i.e., coincident with the center line of the ferrule 10, is disposed at an angle θ relative to the plane 30, which is perpendicular to the longitudinal axis and as depicted schematically in FIG. 3. The offset angle is typically between 8° and 12° and, most typically, is 8°. As such, plane 32 is oftentimes called the 8° plane. By having an angled front face, the ferrule 10 of the present invention reduces disadvantageous reflections of the optical signals and facilitates the coupling of the optical signals between a pair of optical fibers upon which ferrules of the present invention are mounted. For example, the ferrule typically reduces the optical reflections to −70 to −75 dB relative to the optical signals being transmitted.

As a result of its construction, the ferrule 10 also has a relatively small apex offset, that is, a relatively small offset between the apex 34 of the hemispherical surface and the bore 18 defined by the ferrule. In this regard, the apex is defined as the point on the hemispherical surface that protrudes the furthest outward from the ferrule body 12 relative to the plane 32. As noted above, plane 32 is disposed at an angle θ relative to plane 32 and is coincident with the bore. By way of example, FIG. 3 depicts a somewhat exaggerated apex offset D between the apex and the bore with the plane 32 depicted for purposes of explanation. Typically, the apex offset is less than 50 microns and, in some instances, is less than 10 microns with an average apex offset of approximately 30 microns. While an apex offset of 50 microns is generally sufficient to provide optical coupling between a pair of optical fibers upon which APC ferrules are mounted, APC ferrules that have a hemispherical portion 28 with a smaller radius of curvature may require an even smaller apex offset, such as 10 microns or less, in order to provide the desired optical coupling. In this regard, the hemispherical portion typically defines a radius of curvature between 5 millimeters and 12 millimeters. For a hemispherical portion having a radius of curvature of 5 millimeters, the ferrule of the present invention is particularly advantageous since the apex of the hemispherical surface can be repeatedly positioned to be within a relatively small distance, such as 10 microns or less, of the bore.

Figure 5:
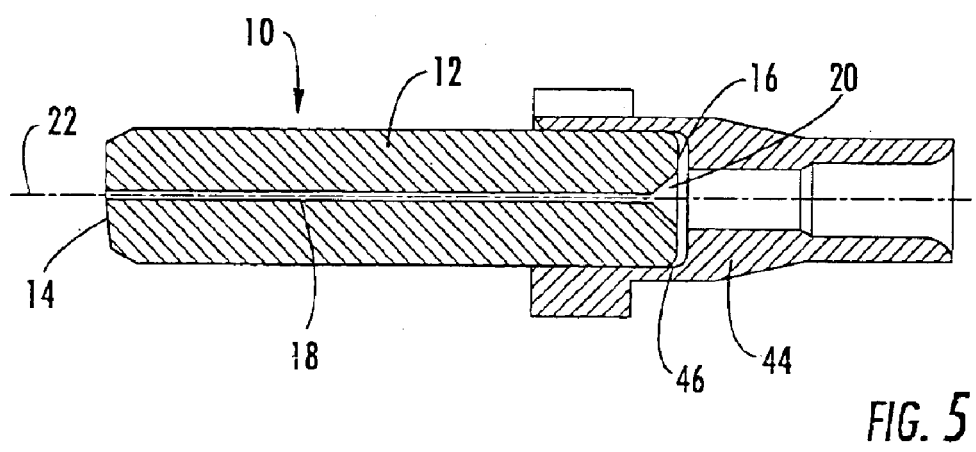
FIG. 5 is a cross-sectional view of a ferrule and a ferrule holder for holding the ferrule during the grinding process.
Figure 4:
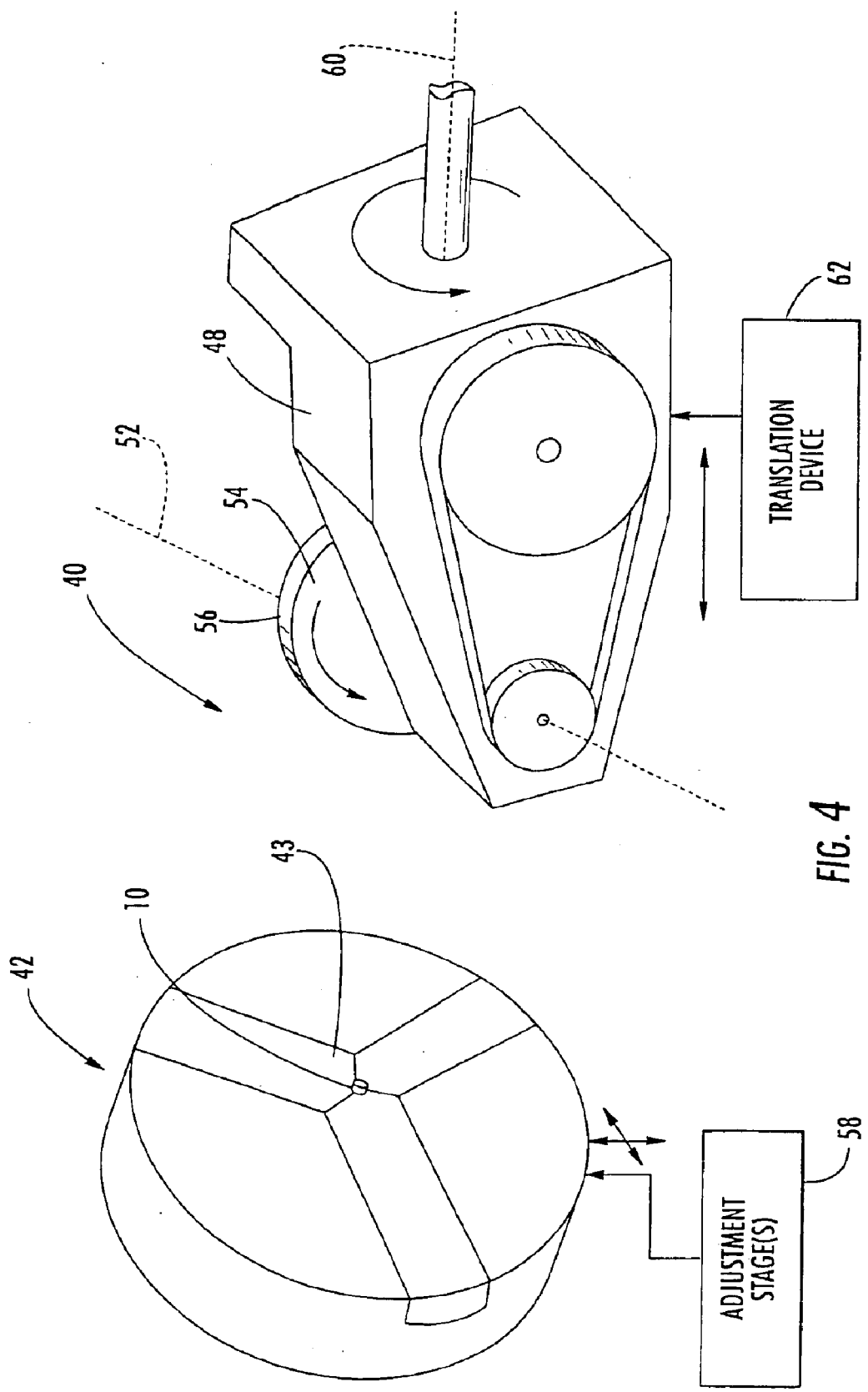
FIG. 4 depicts an apparatus for fabricating a ferrule according to one embodiment to the present invention.

The ferrule 10 of the present invention can advantageously be fabricated in an efficient and repeatable manner by a method and an apparatus provided according to other aspects of the present invention. In this regard, the apparatus 40 for fabricating the ferrule includes a mounting fixture 42 for securely holding the ferrule such that the front face 14 of the ferrule is exposed. See FIG. 4. Prior to the grinding process described below, the front face of the ferrule is generally planar and is perpendicular to the longitudinal axis 22 defined by the ferrule body 12. As shown in FIG. 5, the ferrule is also typically mounted in a ferrule holder 44 during the grinding process. As shown, the ferrule holder defines a well 46 that opens through one end for snugly receiving the rear end of the ferrule. Preferably, the well defined by the ferrule holder is sized such that a predetermined length of the ferrule (termed the "press length") extends outwardly beyond the ferrule holder. In one embodiment, the mounting fixture is a collet 43 in which the ferrule holder and the ferrule are inserted. In particular, the collet of this embodiment includes a plurality of collet jaws 43 for engaging the side surface of the ferrule, as shown in FIG. 4.

The apparatus 40 for fabricating the ferrule 10 also includes a grinder 48. As depicted schematically in FIG. 6, the grinder includes a spindle 50 adapted for rotation about a spindle axis 52 and a grinding wheel 54 mounted upon the spindle for rotation therewith about the spindle axis. Typically, the grinding wheel includes an outer grinding surface 56 that includes grit of a predetermined size to facilitate grinding of the front face of the ferrule. In one embodiment, for example, the grinding surface may include diamond granules or grit having an average size of about 15 microns. In order to form the hemispherical portion 28 of the front face 14 of the ferrule as described below, the grinding surface of the grinding wheel is preferably arcuate and defines a predetermined radius of curvature. In order to form a hemispherical surface having a radius of curvature between 5 millimeters and 12 millimeters, the arcuate grinding surface of the grinding wheel also preferably defines a radius of between 5 millimeters and 12 millimeters since the radius of curvature of the arcuate grinding surface defines the corresponding radius of curvature of the resulting hemispherical portion of the front face of the ferrule.

The apparatus 40 for fabricating the ferrule 10 also preferably includes a plurality of adjustment stages 58 for adjusting the position of at least one of the mounting fixture 42 and the grinder 48 in respective planes relative to the other of the mounting fixture and the grinder. Typically, the mounting fixture is positioned in respective planes relative to the grinder by the plurality of adjustment stages. In this regard, the plurality of adjustment stages can adjust the position of the mounting fixture in at least two orthogonal directions, such as an upward/downward direction and a lateral direction. The position of the mounting fixture and, in turn, the ferrule, can be accurately aligned with respect to the grinding wheel 52.

Figure 6:
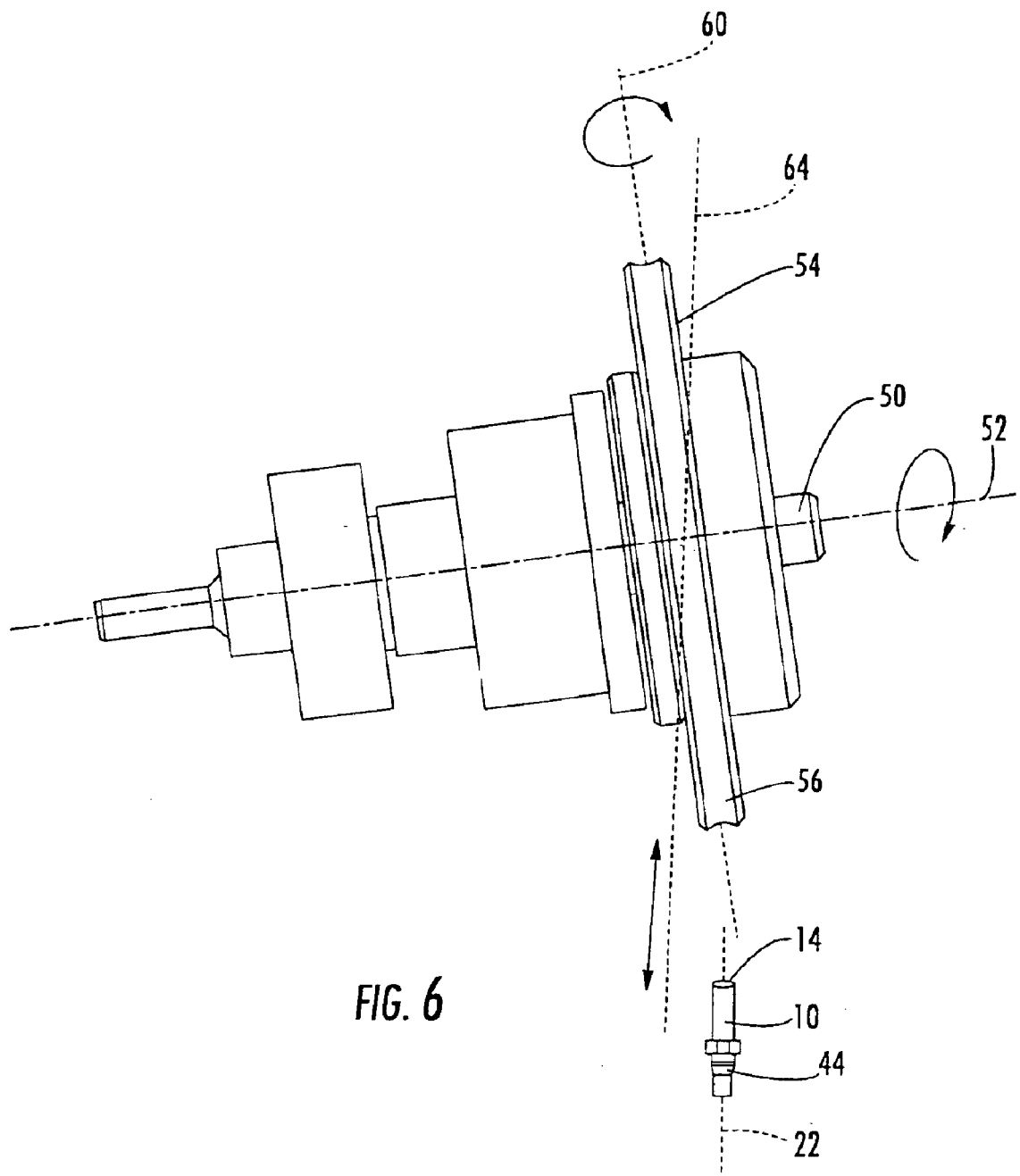
FIG. 6 is a schematic representation of at least a portion of an apparatus for fabricating a ferrule according to one embodiment of the present invention that illustrates the spindle and the grinding wheel in more detail.

In addition to rotating the spindle 50 and the grinding wheel 54 about the spindle axis 52, the grinder 48 is also adapted to rotate both the spindle and the grinding wheel about an offset axis 60 as depicted in FIG. 6. As shown, the offset axis is perpendicular to the spindle axis and is coplanar with both the spindle axis and the longitudinal axis 22 defined by the ferrule body 12. The grinder is adapted to rotate the spindle and the grinding wheel about the spindle axis at a faster rate, however, than the rate at which the grinder rotates both the spindle and the grinding wheel about the offset axis. For example, the grinder typically rotates the spindle and the grinding wheel about the spindle axis at a rate of approximately 10,000 rpm, while the grinder rotates the spindle and the grinding wheel about the offset axis at a rate of about 60 rpm. As a result of the simultaneous rotation about the spindle axis and the offset axis and the arcuate shape of the grinding surface, the grinder can impart the desired hemispherical shape to a portion 28 of the front face 14 of the ferrule 10.

The apparatus 40 for fabricating the ferrule 10 also includes a translation device 62, such as a translation stage, for advancing at least one of the grinder 48 and the mounting fixture 42 toward the other along a motion axis 64. While either or both of the grinder and the mounting fixture can be moved toward the other along the motion axis, the grinder is typically carried by the translation stage that is controllably moved along a linear slide, while the mounting fixture generally fixes the ferrule in position following alignment of the ferrule with respect to the grinding wheel 54. As such, the translation stage generally advances the grinder toward the ferrule along the motion axis defined by the linear slide at a predetermined feed rate. As shown schematically in FIG. 6, the motion axis extends longitudinal parallel to the axis 22 defined by the ferrule body 12 and is coplanar with the spindle axis 52, the offset axis 60 and the longitudinal axis.

During the advancement of the grinder 48 toward the ferrule 10, the grinder rotates the spindle 50 and the grinding wheel 54 about both the spindle axis 52 and the offset axis 60, albeit at different rates as described above. Once the grinding surface 56 of the grinding wheel engages the front face 14 of the ferrule, the simultaneous rotation of the grinding wheel about both the spindle axis and the offset axis imparts a hemispherical shape to a portion 28 of the front face due to the arcuate shape of the grinding surface.

Typically, the rates at which the grinder rotates the spindle and the grinding wheel about the spindle axis and the offset axis as well as the feed rate at which the translation device 62 advances the grinder toward the ferrule define the material removal rate, with increased rates of rotation and/or an increased feed rate correspondingly increasing the material removal rate. While the grinder 48 can be advanced at different feed rates, the grinder of one embodiment is advanced at a feed rate of about 0.06 mm/sec.

As a result of the spindle axis being offset from the plane 30 perpendicular to the longitudinal axis 22 defined by the ferrule body 12 by the predetermined offset angle θ, typically between 8° and 12°, and the offset axis being correspondingly offset by the same predetermined angle from the longitudinal axis defined by the ferrule, the hemispherical surface is angled as described above.

The translation stage continues to advance the grinder 48 toward the ferrule 10 until a hemispherical portion 28 of the desired size has been formed. In this regard, since the ferrule extends beyond the ferrule holder 44 by a predetermined distance, i.e., the press length, and since the respective positions of the grinding wheel 54 and the mounting fixture 42 can be precisely determined with a laser micrometer or the like, the translation stage can controllably advance the grinder a predetermined distance toward the ferrule, with the predetermined distance being selected such that the hemispherical portion of the desired size is thereby formed. As shown in FIG. 2, the hemispherical portion is preferably sized so as to encompass more than half of the front face 14 of the ferrule and to include that portion of the front face of the ferrule through which the bore 18 opens. However, advancement of the grinder toward the ferrule is preferably halted while the front face of the resulting ferrule still includes a plateau 26 so as to prevent unnecessary wear of the grinding wheel.

As a result of the fabrication technique of the present invention including the simultaneous rotation of the spindle 50 and the grinding wheel 54 about both the spindle axis 52 and the offset axis 60 and the concurrent advancement of the grinder 48 toward the ferrule 10 along the motion axis 64, the resulting hemispherical portion 28 has an apex 34 that is either coincident with or spaced only slightly from the bore 18, regardless of the depth to which the ferrule is ground. Thus, the fabrication method is repeatable such that the resulting ferrules are of a consistent quality.

According to the present invention, the plateau 26 is designed to accommodate any differences in the press length of the ferrule 10, that is, the length of the ferrule that extends beyond the ferrule holder 44. In this regard, if the ferrule is either slightly longer than normal or is not pressed as deeply as normal into the well 46 defined by the ferrule holder, the grinder 48 will actually move more material resulting in a larger hemispherical portion 28 and a smaller plateau. In contrast, a slightly shorter ferrule or a ferrule that is pressed more deeply into the well defined by the ferrule holder will be ground less such that the plateau will be larger and the hemispherical portion will be smaller. In either instance, however, the apex of the hemispherical portion will still either be coincident with or only slightly offset from the bore 18 defined by the ferrule and the amount of any apex offset will be consistent irrespective of mount of material that is removed.

In addition, the fabrication method of the present invention is quite efficient and the resulting hemispherical surface 28 need only be slightly polished in order to complete the fabrication process. In this regard, the size of the grit carried by the grinding wheel 54 and the rate at which the grinding wheel is rotated about the spindle axis 52 generally defines the surface roughness. For a grinding wheel with diamond grit of 15 microns and rotating at 10,000 rpm, the hemispherical portion of the front face 14 of the ferrule 10 is generally quite smooth with a surface roughness of about 100 to 400 nanometers as measured peak to valley. In addition, the plateau generally need not be polished, thereby further conserving polishing consumables and reducing fabrication time. As such, the ferrule does not require extensive post-grinding operations and the resulting fabrication costs may therefore be reduced relative to conventional techniques for fabricating APC ferrules.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ferrule comprising:
   a ferrule body extending lengthwise between opposed front and rear faces to thereby define a longitudinal axis, the ferrule body defining a lengthwise extending bore capable of receiving an end portion of an optical fiber, wherein the front face of the ferrule body includes a ground portion and an unground portion, wherein the bore opens through the ground portion, the ferrule body includes a chamfer adjacent to the front face, and the unground portion is disposed proximate to the chamfer.

2. The ferrule according to claim 1, wherein the ground portion is rearward of the unground portion.

3. The ferrule according to claim 1, wherein the unground portion is a plateau.

4. The ferrule according to claim 1, wherein a plane coincident with the bore is disposed at an offset angle to a plane perpendicular to the longitudinal axis.

5. The ferrule according to claim 4, wherein the plane coincident with the bore is disposed at an offset angle of between about 8° and about 12° relative to the plane perpendicular to the longitudinal axis.

6. The ferrule according to claim 1, wherein the unground portion extends across less than 50% of the front face of the ferrule body.

7. A ferrule comprising:
   a ferrule body extending lengthwise between opposed front and rear faces, the ferrule body having a lengthwise extending bore defining a longitudinal axis, the bore capable of receiving an end portion of an optical fiber, wherein the front face of the ferrule body includes a compound surface having a ground portion and an unground portion, the ground portion having a hemispherical portion through which the bore opens, the ferrule body includes a chamfer adjacent to the front face, and the unground portion is disposed proximate to the chamfer.

8. The ferrule according to claim 7, wherein the unground portion is rearward of the ground portion.

9. The ferrule according to claim 7, wherein a plane coincident with the bore is disposed at an offset angle to a plane perpendicular to the longitudinal axis.

10. The ferrule according to claim 9, wherein the plane coincident with the bore is disposed at an offset angle of between 8° and 12° relative to the plane perpendicular to the longitudinal axis.

11. The ferrule according to claim 7, wherein the unground portion extends across less than 50% of the front face of the ferrule body.

12. A ferrule comprising:
    a ferrule body extending lengthwise between opposed front and rear faces to thereby define a longitudinal axis wherein the ferrule body defines a lengthwise extending bore capable of receiving an end portion of an optical fiber and a chamfer, the chamfer being adjacent to the front face, and the front face of the ferrule body includes a ground portion and an unground portion, wherein the bore opens through the ground portion, and the unground portion is disposed proximate to the chamfer.

13. The ferrule according to claim 12, wherein the ground portion is rearward of the unground portion.

14. The ferrule according to claim 12, wherein the unground portion is a plateau.

15. The ferrule according to claim 12, wherein a plane coincident with the bore is disposed at an offset angle to a plane perpendicular to the longitudinal axis.

16. The ferrule according to claim 15, wherein the plane coincident with the bore is disposed at an offset angle of between about 8° and about 12° relative to the plane perpendicular to the longitudinal axis.

17. The ferrule according to claim 12, wherein the unground portion extends across less than 50% of the front face of the ferrule body.

* * * * *